Patented July 6, 1954

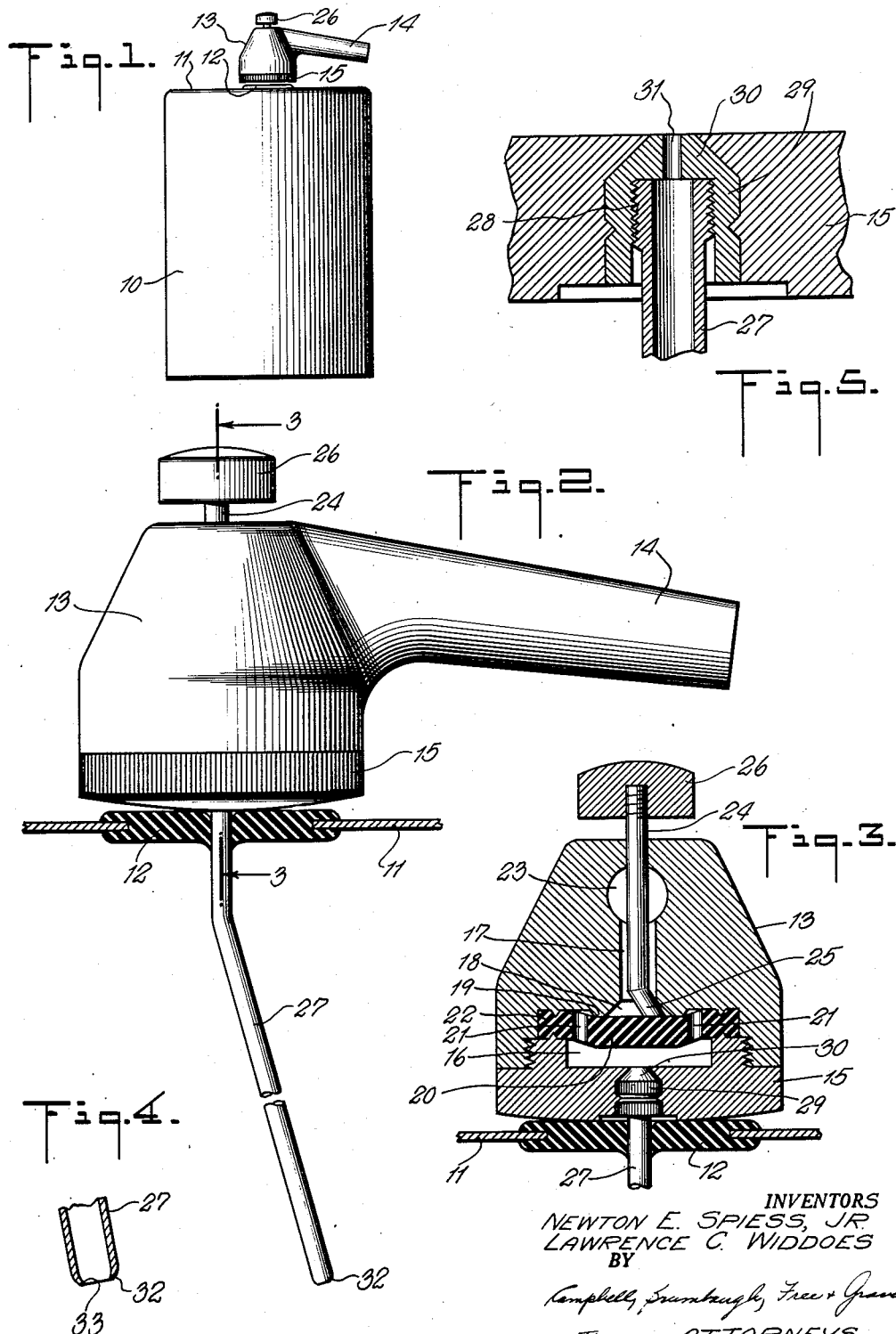

2,682,977

UNITED STATES PATENT OFFICE 2,682,977

WHIPPED CREAM DISPENSER

Newton E. Spiess, Jr., Oakdale, and Lawrence C. Widdoes, Bohemia, N. Y., assignors to National Dairy Research Laboratories, Inc., Oakdale, Islip, N. Y., a corporation of Delaware Application April 7, 1949, Serial No. 85,968

6 Claims. (Cl. 222—394)

The present invention relates to methods and apparatus for whipping cream by effervescence, and embodies more specifically an improved method and apparatus by means of which cream under pressure may be discharged in such fashion that it will be whipped to a desired and controlled degree.

The foregoing and other objects are attained by means of a control valve mechanism and duct system through which the cream passes from a region of relatively high pressure and by which it is discharged at a desired point in a region of relatively low pressure. In order to accomplish the desired control over the whipping action that takes place by effervescence, the passage through which the cream passes from the high pressure to the low pressure discharge point is provided with an aperture that forms a restricted orifice. As will be pointed out hereinafter, properties of this orifice, if properly designed, in its relation to the passage through which the cream passes, become critical factors in accomplishing a desired control over the whipping action of the cream.

Other advantages of the invention will appear as it is described in greater detail in connection with the accompanying drawings, wherein Figure 1 is a view in side elevation showing a design constructed in accordance with the present invention and including a container within which cream may be maintained under pressure;

Figure 2 is an enlarged view partly in section showing the discharge mechanism of Figure 1, and also showing the manner in which it is applied to the container of cream;

Figure 3 is a view in section taken on line 3—3 of Figure 2, and looking in the direction of the arrows;

Figure 4 is a detailed partial view in section showing the manner in which the end of the supply tube may be formed to provide an aperture; and Figure 5 is an enlarged view in section showing one form of structure by means of which the valve casing may be secured to the inlet tube.

Referring to the above drawings, a can or other suitable receptacle for containing cream under pressure is illustrated at 10, the top wall of the can being shown in section at 11 in Figures 2 and 3. In this top wall 11 a plug 12 is provided, the plug being formed of rubber or similar material and suitably secured to the adjacent edges of the top of the can 11 so that the contents of the can will be maintained under a desired pressure and also effectively sealed from the atmosphere.

The can thus is suitable for receiving and containing a quantity of cream under pressure, and when this supply of cream is to be used to form whipped cream, a discharge mechanism is employed of the character now to be described.

The discharge mechanism includes a valve body 13 having an outlet or discharge spout 14 and a bottom cap 15 which is secured to the bottom of the valve body 13 by the thread formation illustrated in Figure 3. The valve body 13 is formed with a valve chamber 16 which communicates with a duct 17 that may be formed with a flaring inlet 18 and communicates between the chamber 16 and duct 17. The inlet terminates in an annular valve seat 19 against which a valve diaphragm 20 is adapted to be seated. The valve diaphragm is formed with passages 21, and at its outer peripheral portion 22 is adapted to be secured between the valve body 13 and the cap 15, as illustrated in Figure 3. The location of the passages 21 are outside of the valve seat 19 so that normally the flexible diaphragm engages the valve seat and closes the valve. The duct 17 communicates with a discharge duct 23, and a valve plunger 24 is slidably received in the valve body 13 and extends through the duct 17, being provided with an angular foot 25 that engages against the flexible diaphragm 20. The outer extremity of the plunger 24 is provided with a press plate 26.

An inlet tube 27 is secured in any suitable fashion to the bottom cap 15. For this purpose the upper end of the tube may be threaded at 28 and received within a threaded bushing 29 that is molded into or otherwise secured to the cover 15. In the form of the invention shown in Figure 5, the bushing 29 is formed with a plate 30 in which a restricted orifice 31 is formed. The orifice 31 serves as a communication between the bore of the tube 27 and the valve chamber 16.

In the form of the invention shown in Figure 4, the extremity of the tube 27 is peened or swaged over 32 to form an aperture 33. This formation at the extremity of the tube provides a sufficient piercing medium to enable the tube 27 to be forced through the plug 12 and thus thrust down into the can. In such position cream under pressure is forced through the tube and into the valve chamber 16. When and as the cream is to be discharged in whipped form, the press plate 26 is depressed and the valve diaphragm 20 lifted from the valve seat 19. The cream then flows through the duct 17 and out through the discharge duct 23. When so discharged, the cream is in whipped form by reason of the effervescing action that takes place when it is directed from a region of high pressure into one of relatively low pressure.

If the effervescing action or expansion were permitted to take place without any control, the whipping action upon the cream would be so great (assuming a fairly substantial pressure of relatively soluble gas upon the cream within the container) that the overrun of the final product would be higher than is desirable. (Overrun equals weight of 100 cc. of cream minus the weight of 100 cc. of the whip over weight of 100 cc. of the whip.) If the pressure of the gas in the container is lowered to reduce the overrun, the drainage of the whipped product is increased, i. e., the stability of the product is lowered. In accordance with the present invention, the properties of the whipped cream, that is, drainage and overrun, are controlled by the provision in the passage through which the cream passes of an orifice having characteristics presently to be described. This orifice must be placed in such a position that cream that is discharged therethrough enters into and flows through a region that forms what will be described as a calming region.

The desired control over the whipping action of the cream is accomplished by forming the aperture 31 or 33 so that the ratio of perimeter, in inches, of the orifice of the aperture to the area, in square inches, of the orifice is between 100 and 500 to 1, and with the further limitation that the greatest dimension across the orifice does not exceed about .06 inch. Round orifices between .009 and .040 inch have been found to be particularly satisfactory for the purpose of the present invention.

As previously stated, it is also to be understood that this orifice should not discharge directly to the atmosphere. Rather, the orifice must lead into a section of tube, passage, or chamber, of large cross sectional area compared to that of the orifice, in which the whipped cream is received and through which it flows to the point of discharge. This region is herein referred to as a calming region and is essential in order that the overrun of the whipped cream be maintained sufficiently low.

By means of the present invention the stability of the whip for a given fat content and overrun is considerably improved. The following table will illustrate this fact, this table being formed from experimental work actually performed:

*Properties of gas whipped creams*

| Description of Cream Mix | Overrun | Drainage[1] |
|---|---|---|
| | Percent | Cc. |
| 22% fat cream charged to 50#/sq." with N₂O; 0.5% stabilizer added; Discharged from conventional dispenser | 250 | 22 |
| 30% fat cream charged to 50#/sq." with N₂O; 0.5% stabilizer added; Discharged from conventional dispenser | 245 | 7 |
| 22% fat cream charged to 75#/sq." with N₂O; 0.5% stabilizer added; Discharged through orifice dispenser | 245 | 5 |
| 22% fat cream charged to 75#/sq." with N₂O; 0.5% stabilizer added; Discharged through conventional dispenser | 400 | 5 |

[1] Amount of whip that will run through a 60° 50 mm. funnel (filled with 106 ml. of whip) in 30 minutes at 40° F.

From the foregoing it will be seen that the conventional whipped cream dispenser is capable of producing a low overrun (250%) with a high stability (7 cc. drainage) only by the use of cream of 30% fat content. The orifice dispenser (constructed in accordance with the present invention) is able to produce this same product from cream of 22% fat content. It might also be mentioned that tests with creams of higher fat content show similar improvements in the quality of the whip.

The foregoing table also illustrates the fact that the present invention enables the percentage overrun during whipping action to be substantially reduced. Another advantage resulting from the structure and method above described is that the maximum rate of flow of the cream through the dispenser is fixed. In this connection, it has been found that the best results are obtained in operation when the pressure in the container is at least 50 pounds per square inch.

In manufacturing the mechanism hereinabove described, the valve body and parts may be formed of a suitable plastic composition, and the metallic parts should be of stainless steel. The valve parts may be readily taken apart for cleansing and, in view of the nature of the parts, there is no difficulty in reassembling them.

While the invention has been described with specific reference to the accompanying drawings, it is not to be limited save as defined in the appended claims.

We claim:

1. Cream whipping means comprising conduit forming means adapted to be inserted into a receptacle containing cream under pressure and having an inlet and an outlet to discharge the cream in a whipped condition, a communicating duct forming a restricted orifice of predetermined size, the greatest dimension across the orifice not exceeding 0.06 inch, said orifice being spaced from the discharge end of the conduit forming means, the ratio of perimeter, in inches, to area, in square inches, of the orifice being between 100 and 500 to 1 and a discharge duct between said communicating duct and the outlet having a cross sectional area large compared to that of said communicating duct for calming the flow of whipped cream.

2. Cream whipping means comprising a housing, an elongated tube carried by the housing and adapted to be inserted into a receptacle containing cream under pressure, an orifice of predetermined size in the tube having a ratio of perimeter, in inches, to area, in square inches, of from 100 to 500 to 1, the greatest dimension across the orifice not exceeding 0.06 inch, a valve in the housing and a discharge conduit having a cross sectional area large compared to that of the orifice leading from the orifice.

3. Cream whipping means comprising a housing, an elongated tube carried by the housing and adapted to be inserted into a receptacle containing cream under pressure, a valve chamber in the housing adjacent one end of the elongated tube, a manually operable valve in the chamber, a discharge duct communicating with the valve chamber through the valve, and an orifice of predetermined size in the tube, the discharge duct having a large cross-sectional area compared to that of the orifice, the ratio of perimeter, in inches, to area, in square inches, of the orifice being between 100 and 500 to 1, the greatest dimension across the orifice not exceeding 0.06 inch.

4. The device defined in claim 3 wherein the orifice is at the entrance of the tube.

5. The device defined in claim 3 wherein the orifice is at said one end of the tube adjacent the valve chamber.

6. Cream whipping means comprising a housing, an elongated tube carried by the housing and adapted to be inserted into a receptacle containing cream under pressure, a valve chamber in the housing, a flexible valve and valve seat in the chamber, a discharge duct communicating with the valve chamber through the valve seat and valve, and a restricted orifice of predetermined size, said discharge duct having a large cross-sectional area compared to that of said orifice, said orifice having a ratio of perimeter, in inches, to area, in square inches, of between 100 and 500 to 1 and communicating between the valve chamber and the tube, the greatest dimension across the orifice not exceeding 0.06 inch.

References Cited in the file of this patent

UNITED STATES PATENTS

| Number | Name | Date |
| --- | --- | --- |
| 991,725 | Kennedy | May 9, 1911 |
| 2,172,035 | Roth | Sept. 5, 1939 |
| 2,281,604 | Smith | May 5, 1942 |
| 2,305,286 | Ward | Dec. 15, 1942 |
| 2,372,392 | Pletman | Mar. 27, 1945 |
| 2,378,451 | Vensel | June 19, 1945 |
| 2,400,231 | Gebauer et al. | May 14, 1946 |
| 2,562,111 | Michel | July 24, 1951 |

FOREIGN PATENTS

| Number | Country | Date |
| --- | --- | --- |
| 130,319 | Germany | Apr. 29, 1902 |